United States Patent [19]

Price

[11] Patent Number: 5,678,409
[45] Date of Patent: Oct. 21, 1997

[54] PASSIVE THREE STATE ELECTROMAGNETIC MOTOR/DAMPER FOR CONTROLLING STIRLING REFRIGERATOR EXPANDERS

[75] Inventor: Kenneth D. Price, Long Beach, Calif.

[73] Assignee: Hughes Electronics, Los Angeles, Calif.

[21] Appl. No.: 667,558

[22] Filed: Jun. 21, 1996

[51] Int. Cl.⁶ .................................................. F25B 9/00
[52] U.S. Cl. ........................................... 62/6; 244/158 R
[58] Field of Search .................... 62/6, 51.1; 244/158 R

[56] References Cited

U.S. PATENT DOCUMENTS

| | | | |
|---|---|---|---|
| 5,088,288 | 2/1992 | Katagishi et al. | 62/6 |
| 5,385,021 | 1/1995 | Beale | 62/6 |
| 5,412,951 | 5/1995 | Wu | 62/6 |
| 5,502,968 | 4/1996 | Beale | 62/6 |
| 5,582,013 | 12/1996 | Neufeld | 62/6 |

OTHER PUBLICATIONS

"Advances in Cryogenic Engineering", *Proceedings of the Cryogenic Engineering Conference*, vol. 35, Part B, 1989, pp. 1423–1430.

*Primary Examiner*—Ronald C. Capossel
*Attorney, Agent, or Firm*—Gordon R. Lindeen, III; Michael W. Sales; Wanda K. Denso-Low

[57] ABSTRACT

A three state EM motor/damper used in a ground-based or space-based Stirling refrigerator expander mechanism provides multiple states of operation to obtain fail safe performance during assembly, launch (space based refrigerators), and operation. The device is attached to the expander's reciprocating displacer to enable actuation during assembly, provide maximum damping during launch, and provide attenuated damping to control displacer motion during operation as a refrigerator. The motor/damper is a linearly actuated "voice coil" device employing a moving coil wound on an electrically conductive bobbin and oscillating within a permanent magnet/back iron field assembly. The electrically conductive bobbin internally generates and dissipates eddy currents when moved through the magnetic field. The bobbin acts as a coil of one turn, shorted to itself. This mechanism transforms kinetic energy to electrical energy, which then dissipates as heat. In this manner, mechanical energy is removed from the system. Operational states are obtained by switching the coil terminals at a multi-pole relay that alternately connects a voltage supply, a dead short, or a short through a ballast resistor. In the event of a switch open failure, fail safe performance during launch and operation is provided by the fixed, intrinsic damping of the coil bobbin.

20 Claims, 4 Drawing Sheets

PASSIVE THREE STATE ELECTROMAGNETIC MOTOR/DAMPER FOR CONTROLLING STIRLING REFRIGERATOR EXPANDERS

BACKGROUND OF THE INVENTION

1. Field of the Invention

This invention relates to Stirling refrigerator expanders and more specifically to a three state electromagnetic (EM) motor/damper that provides passive damping during operation to maintain the desired phase relationship between the displacer and pressure wave and provides a intrinsic fail safe damping force.

2. Description of the Related Art

Spacecraft use optical systems to gather infrared (IR) radiation and image it onto a focal plane array of IR sensors. These IR sensors operate best at very low temperatures, typically 35°–100° K. As a result, the focal plane array must be refrigerated. Furthermore, the refrigeration system must have a long lifetime and high reliability.

Current refrigerator technology designed for spacecraft employ the Stirling thermodynamic cycle implemented with a reciprocating compressor and a reciprocating expander, which operate on the thermodynamic principle that compressing a gas increases its pressure and temperature and expanding a gas reduces its pressure and temperature. A known Stirling expander is described in "Advances in Cryogenic Engineering," Proceedings of the Cryogenic Engineering Conference, Vol. 35, Part B, 1989, pp. 1423–1430. The compressor applies a sinusoidal pressure wave to the Stirling expander, which in turn drives a displacer at the same frequency as the pressure wave and with a known phase relation to the pressure wave. The expander executes a thermodynamic cycle commonly known as a Stirling cycle. The cycle is composed of four processes: isothermal compression, high pressure gas transfer to the cold tip, isothermal expansion, and low pressure gas transfer to the warm end. The expansion process produces refrigeration at the cold tip, where heat from a low temperature source (such as an IR sensor) can be absorbed.

Refrigerator efficiency is controlled by the amplitude and phase angle of the displacer motion relative to the pressure wave. The forces applied to the displacer include a pneumatic force from the pressure wave, a flexure force from the flexures that are used to suspend and align the displacer, and an inertial force of the moving displacer. However, the sum of these forces alone does not produce optimal motion. As a result, an EM motor is used to actively control the displacer's motion during orbit.

The motor includes a moving bobbin that is wound with a copper coil and mechanically connected to the displacer. In known expanders, the bobbin is made of a low or non-electrically conductive material to minimize production of dissipative eddy currents. A magnetic circuit generates a magnetic field across a gap in the circuit such that the motion of the displacer causes the coil to interact with the magnetic field and produce forces when current is applied. During assembly, a DC voltage is applied across the leads of the coil to produce a motor DC force that positions the displacer to align the flexures. During launch, heavy damping is required to protect the displacer from slamming into the end of the Stirling expander. To accomplish this, the lead wires are shorted together, which minimizes the resistance of the coil and thus produces a maximum damping force that opposes the motion of the displacer. During operation or orbit, a servo control loop is used to actively control the motion of the displacer to maintain the desired phase relationship to the pressure wave.

The servo control loop includes a position sensor that senses the displacement of the displacer. A control circuit compares the sensed position to the desired position and generates an error signal. A servo compensation circuit responds to the error signal by generating a motor drive signal. An amplifier converts the drive signal into a drive current that is applied to the coil to produce the motor force that maintains the desired phase relation.

The servo control loop reduces the reliability of the refrigeration system. For example, if a wire gets crossed during assembly the negative feedback loop can become a positive feedback loop. As a result, when the expander is first activated for testing, the displacer will slam into the cold tip destroying both the displacer and the cold tip. This condition, known as "jack hammer" mode, can also occur if the coil is accidentally open circuited or if the expander power is not on when the compressor is turned on. Furthermore, if the coil is open circuited during launch, the motor will provide zero damping and the displacer will be damaged. Lastly, a failure in the control circuit will eliminate all control over the displacer such that the desired phase relation, and consequently the refrigeration, will be lost.

SUMMARY OF THE INVENTION

In view of the above problems, the present invention provides a more reliable and fail-safe three state EM motor/damper for a Stirling expander that provides passive damping control during operation and intrinsic fail-safe damping during launch.

This is accomplished by constructing the bobbin of the motor/damper from an electrically conductive material so that the bobbin forms a single turn coil that is shorted to itself. The motion of the Stirling expander's displacer causes the bobbin to interact with a permanent magnetic field and produce an intrinsic damping force that opposes the motion. The bobbin is sized to produce the required damping force during operation. A multi-turn coil is also wound around the bobbin to enable motor action when current is applied and/or to obtain additional damping force when the coil's leads are shorted.

A relay switch replaces the servo loop control used in known systems. The relay switch short circuits the multi-turn coil during launch to maximize the total damping force. During orbit, the relay switch preferably adds series resistance to the coil to reduce the total damping force to maintain the desired phase relation between the displacer and the pressure wave inside the Stirling expander. Alternately, the bobbin can be designed so that its intrinsic damping force provides the entire damping force required to maintain the phase relation. In this case, the relay switch open circuits the multi-turn coil during orbit.

These and other features and advantages of the invention will be apparent to those skilled in the art from the following detailed description of preferred embodiments, taken together with the accompanying drawings, in which:

3

Figure 4:
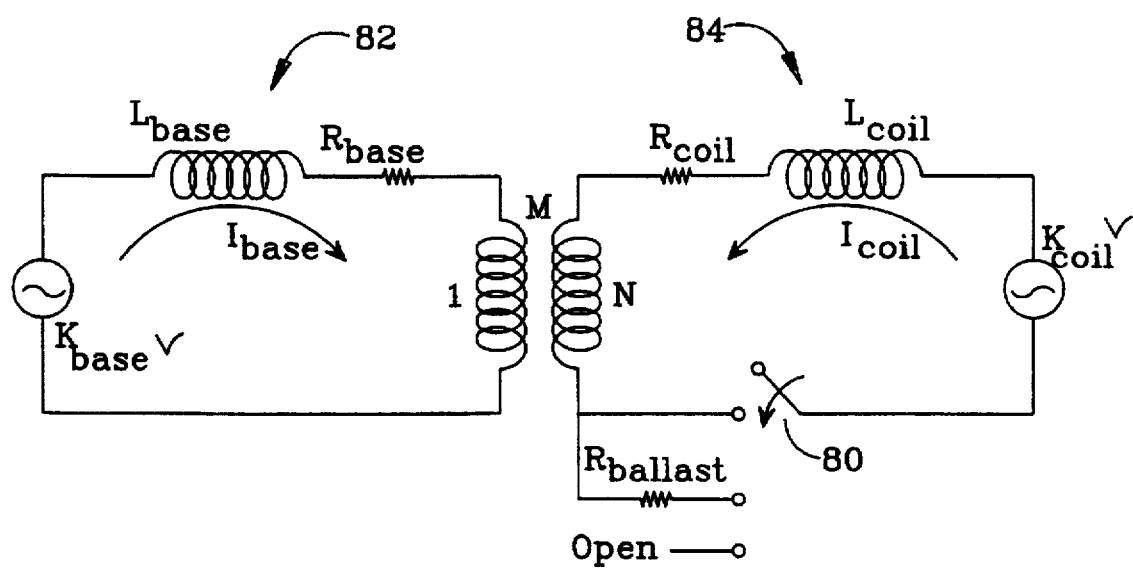
Figure 5:
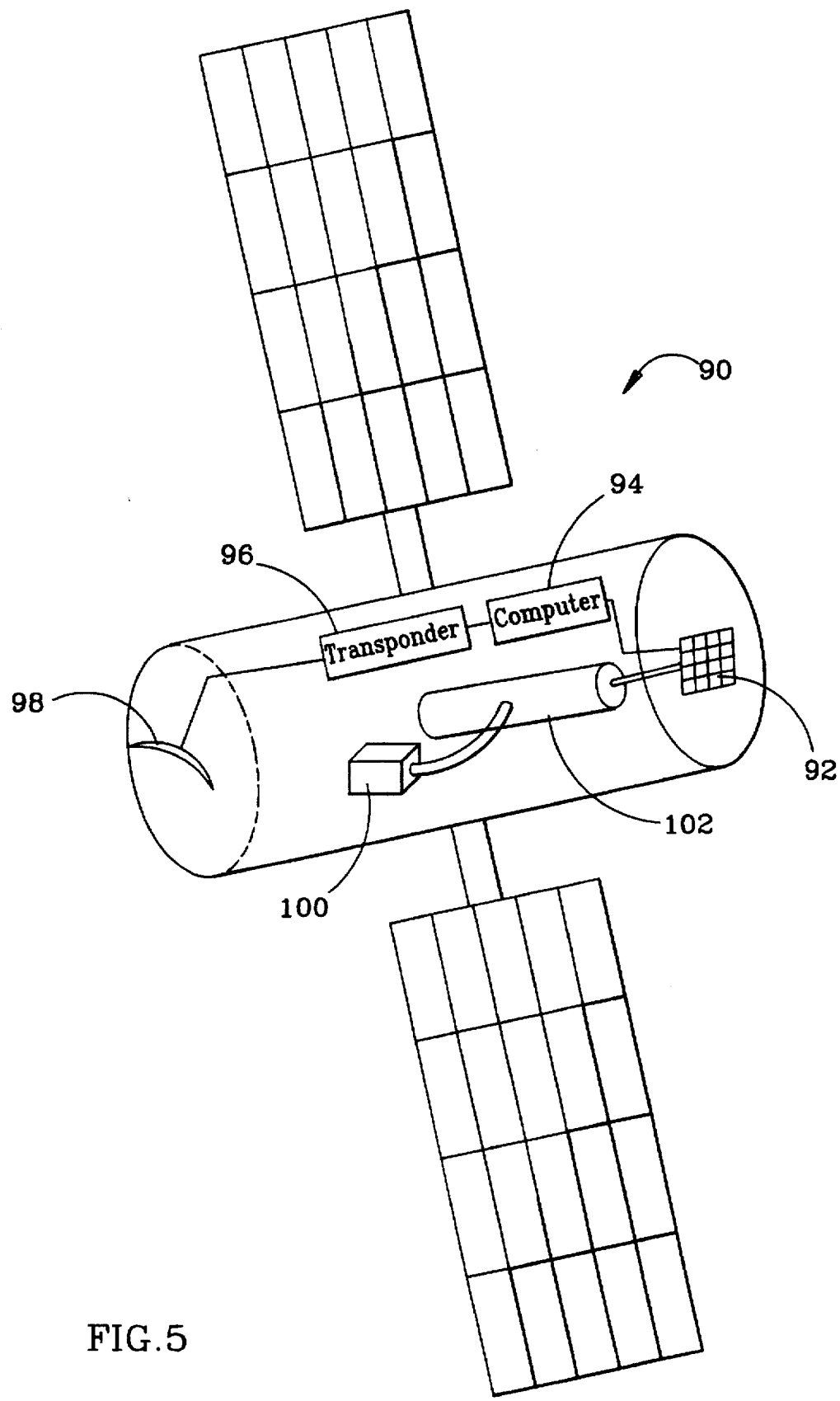

FIG. 4 is an equivalent circuit diagram of the 3-state EM motor/damper during launch and orbit; and FIG. 5 is a perspective view of a spacecraft that uses a Stirling expander in accordance with the present invention to provide cryogenic cooling.

DETAILED DESCRIPTION OF THE INVENTION

Figure 1:
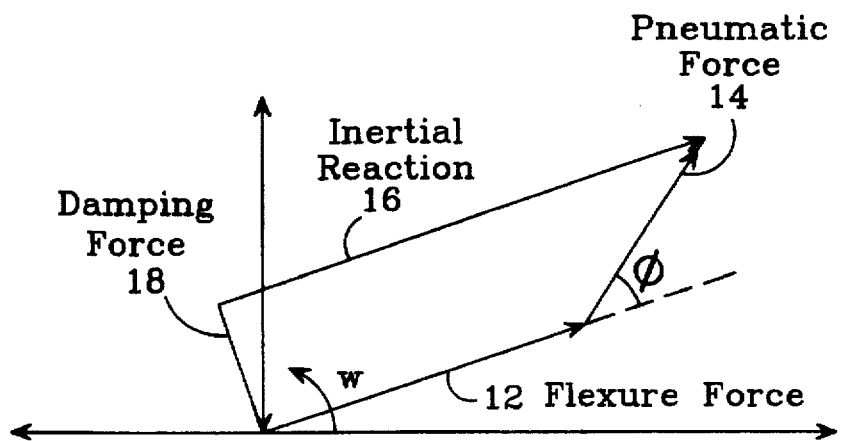
FIG. 1 is a phasor diagram of the forces exerted upon the displacer in a Stirling expander.

FIG. 1 illustrates the forces that are exerted upon the displacer during operation. The forces include a flexure force 12 that is proportional to the displacement of the displacer, a pneumatic force 14 from the pressure wave, an inertial reaction 16 associated with the movement of the displacer, and a control force 18 exerted by the three state EM motor/damper. The known systems treat the control force 18 as a motor force that must be supplied to retard displacer motion to the system to maintain the phase relation, $\Phi$. The Applicant realized that the control force 18 does not add energy to the system, but actually removes energy, and hence the control force is actually a damping force.

As a result, the active servo loop control in known Stirling expanders has been eliminated in the present invention and replaced with a passive control system that provides fail safe damping and improved reliability. In the preferred embodiment, the bobbin is constructed from low resistance material such as copper so that it forms a single turn coil, which interacts with the magnetic field to provide an intrinsic damping force. During launch, the multi-turn coil is preferably shorted such that its damping force adds to the bobbin's intrinsic damping force to protect the displacer. During operation the desired phase relation is preferably maintained by switching a ballast resistor in series between the multi-turn coil's leads to reduce its damping force such that the total damping force maintains the desired phase relation. Alternately, the bobbin could be designed to provide the entire damping force required during operation. In this case, the multi-turn coil is open circuited after launch. The intrinsic damping force protects the displacer at all times and will maintain the refrigeration cycle, although sub-optimally, if the relay switch should fail.

Figure 2:
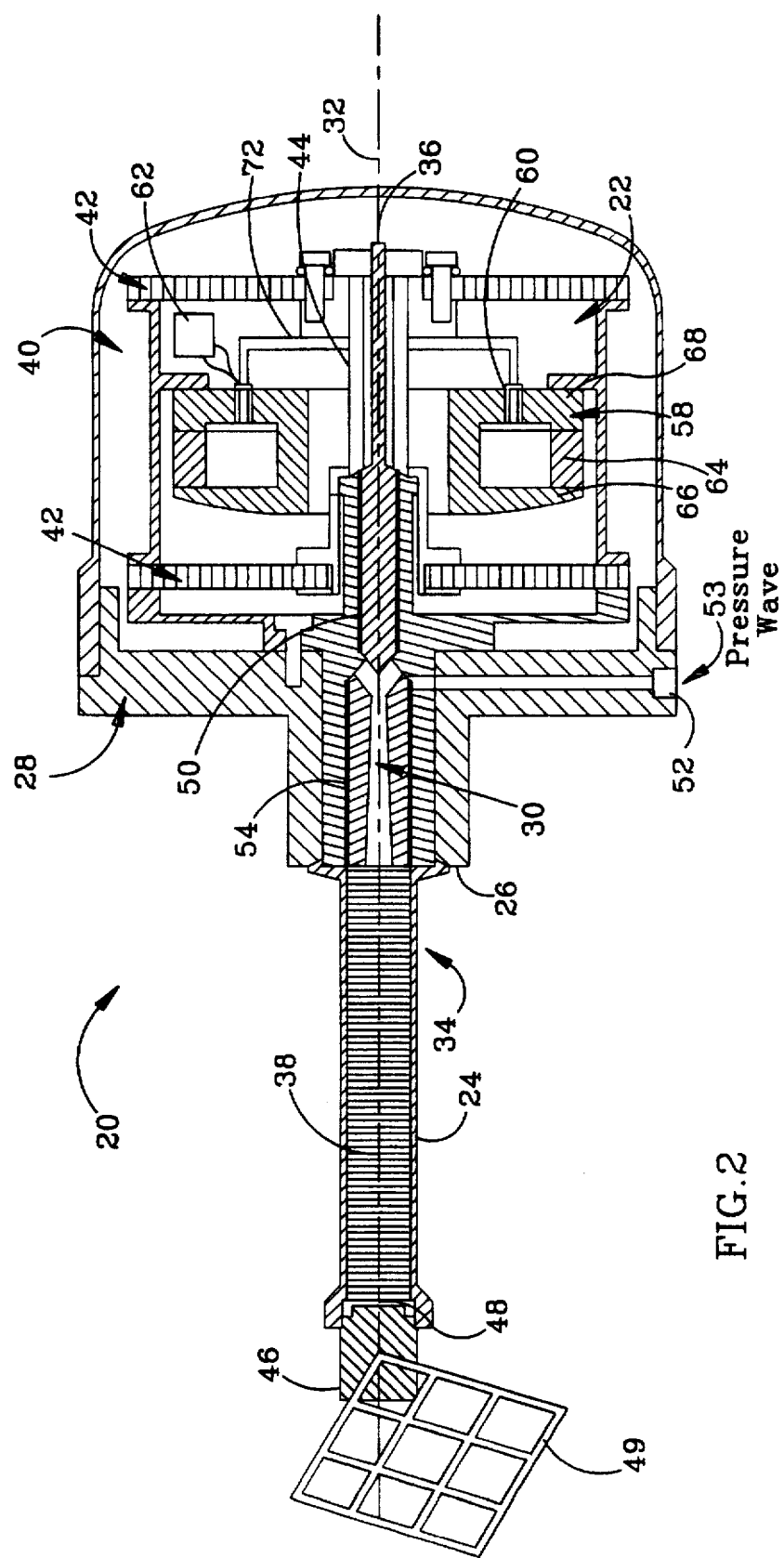
FIG. 2 is a sectional view of a Stirling expander that includes the 3-state EM motor/damper in accordance with the invention.

FIG. 2 illustrates a Stirling expander 20 that incorporates a passive three state EM motor/damper 22 for providing displacer control during assembly, launch, and operation on orbit. A sleeve 24, suitably 5 cm in length and 1.25 cm in diameter, is connected to the forward opening 26 of a pressure housing 28. The sleeve 24 and pressure housing 28 define a passageway 30 that is oriented along a displacement axis 32. A displacer 34 includes a drive shaft 36 and a wire mesh regenerative head exchanger stacked into a piston 38.

A suspension system 40 holds the drive shaft 36 so that it can oscillate the piston 38 along the displacement axis 32 inside the passageway 30. The suspension system 40 includes two sets of flexures 42 that are positioned near the respective ends of the drive shaft 36. Each set of flexures 42 includes 4 or 5 annular patterned metal disks that are separated by spacers and formed around but not contacting the drive shaft 36. A support 44 connects the flexures 42 to the drive shaft 36 so that the displacer can oscillate back-and-forth by approximately ±1 mm. The flexures 42 exert a flexure force on the displacer equal to $-kx$ where k is the spring constant of the flexures and x is the displacement along the displacement axis 32.

A cold tip 46, suitably copper, pressure seals the distal end of the passageway 30 to enclose a cold volume 48. The cold tip 46 forms a thermal connector to a device 49 such as a focal plane array or superconducting electrical circuitry. A seal 50 is fitted around the drive shaft 36 to pressure seal the other end of the passageway 30. The passageway 30 is filled with a gas such as helium, oxygen or nitrogen under 30–40 atmospheres of pressure. An inlet 52 couples an externally applied pressure wave 53, typically oscillating at 30–60 Hz, to the passageway 30. A pressure seal 54 around the displacer directs the pressure wave through the piston 38.

During orbit, the drive shaft 36 is controlled so that the wire mesh piston 38 oscillates at the same frequency as and with a known phase relation, typically 30°–45°, to the pressure wave 53. The optimum phase relation depends upon the precise physical dimensions of the expander. As a result, the energy in the gas is distributed to form a temperature gradient along the length of the sleeve 24 so that the cold tip 46 is maintained at a temperature between 20° K. and 100° K., and the other end of the sleeve is heated to approximately 300° K. The refrigeration produced in the cold volume 48 is used to cool the device 49 attached to the cold tip 46. The energy at the warm end is rejected through a radiative heat sink to deep space.

In general, the phase is selected so that as the pressure is falling at the cold volume 48, the displacer 34 is pulled back to draw the gas towards the cold tip. The combination of falling pressure and expanding volume provides refrigeration that maintains the temperature at the cold tip between 20° K. and 100° K.

The displacer's wire mesh piston 38 functions as a regenerative heat exchanger. As the gas passes through the mesh moving towards the cold tip, heat is transferred from the gas to the mesh. When the gas returns through the wire mesh, the heat is transferred back into the gas.

Figure 3:
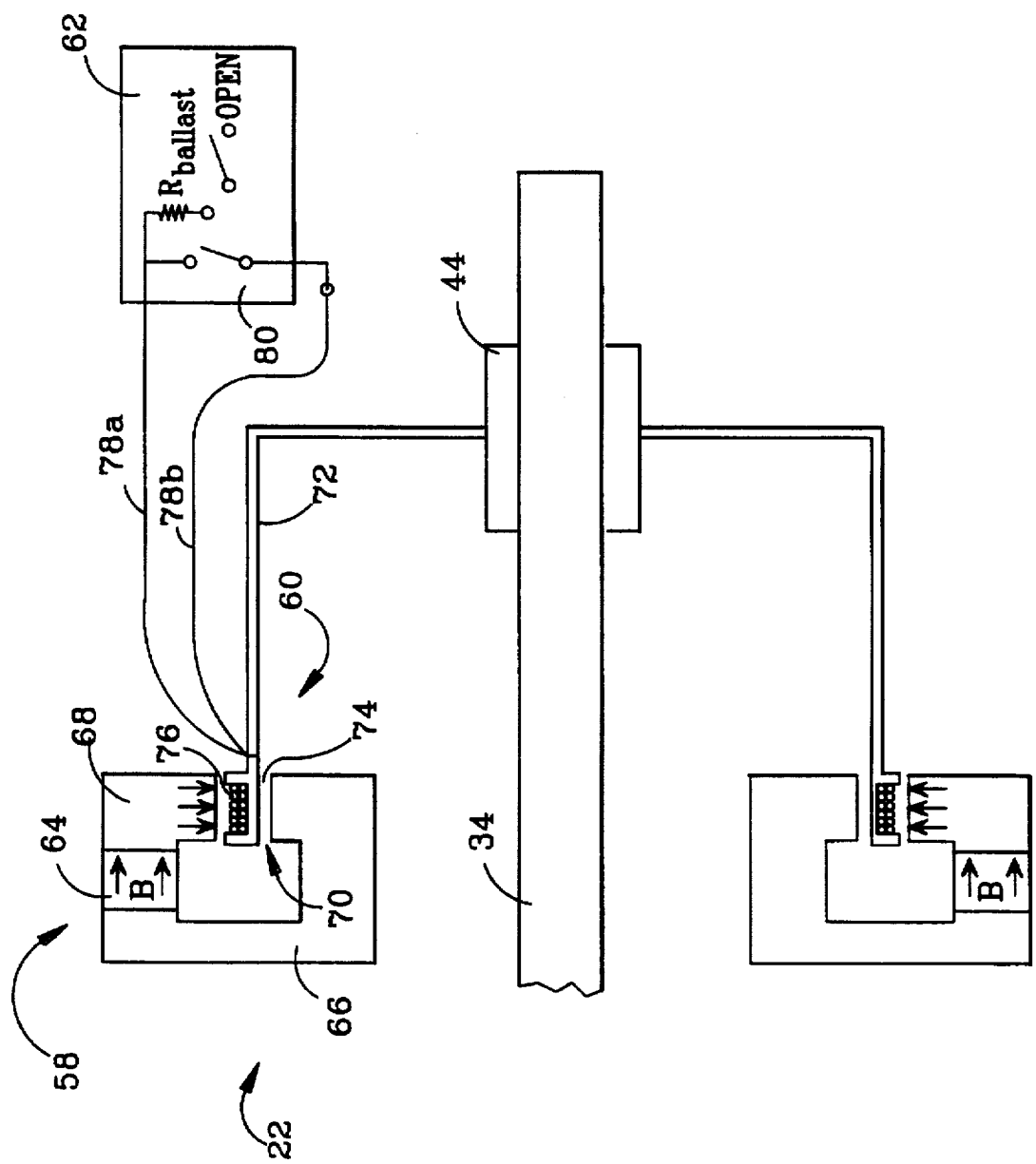
FIG. 3 is an enlarged sectional view of the 3-state EM motor/damper shown in FIG. 2.

The three state EM motor/damper 22, as shown in an enlarged view in FIG. 3, is used to control the motion of the displacer 34 during assembly, launch, and orbit. The motor/damper 22 includes a magnetic circuit 58 that establishes a magnetic field $\vec{B}$, a coil bobbin 60 wound with a multi-turn coil 76 that moves with the displacer 34 and interacts with the magnetic field to generate a damping force, and a control circuit 62 that controls the series resistance of the multi-turn coil to set the magnitude of the damping force.

The magnetic circuit 58 includes a polarized ring magnet 64 and inner and outer cylindrical back iron poling pieces 66 and 68, respectively. The back iron poling pieces 66 and 68 on either side of the ring magnet 64 are designed to focus the magnetic field $\vec{B}$ across a gap 70 in a radial direction that is substantially normal to the displacement axis 32. Alternately, any portion of the magnetic circuit can be formed from a polarized ring magnet.

The coil bobbin 60 includes a cylindrical support 72 that is attached to the drive shaft 36 via support 44. The support 72 holds an annular base 74 in the gap 70 such that it interacts with the magnetic field $\vec{B}$. The multi-turn coil 76, typically 100–200 windings of copper wire, is wound around the base 74 with lead wires 78a and 78b. The multi-turn coil 76 can be driven by an applied voltage to produce a motor force or shorted to itself to passively interact with the magnetic field to produce a damping force.

In the preferred embodiment, the annular base 74 is formed from a low resistance material such as copper or aluminum, which have resistivities of $1.7\times10^{-8}$ and $3\times10^{-8}$ $ohm\text{-}cm$, respectively. As a result, the annular base 74 forms a single turn coil that is shorted to itself. The base cannot be driven as a motor because there is no way to apply a voltage. However, the motion of the base through the magnetic field induces an electromotive force and a current in accordance with Faraday's law. The current is quickly dissipated by the resistance of the base. Therefore, the base acts as a damper by extracting kinetic energy from the moving displacer. This damping action occurs in response to the velocity of the displacer 34, and thus the base provides an intrinsic damping force.

The support 72 is preferably formed from a relatively non-conductive material such as steel, which has a resistivity of $75 \times 10^{-8}$ ohm-cm. By making the support 72 a poor conductor, the amount of conductive material in the base 74 that interacts with the magnetic field is essentially the same for positive and negative displacements of the drive shaft. As a result, the damping force is symmetrical.

The control circuit 62 includes a two-position relay switch 80 that preferably shorts the lead wires 78a and 78b during launch to maximize the damping coefficient and connects a ballast resistance in series with the coil 76 during orbit to maintain the desired phase relation. (During assembly, an external DC voltage source applies a signal to the leads 78a and 78b to position the displacer to assist the assembly and seal alignment procedure.) In a first embodiment, the relay switch 80 adds a resistor $R_{ballast}$ in series with the coil 76 to reduce its damping force so that the sum of the intrinsic and controllable damping forces maintains the desired phase relation. In this case, the annular base 74 is designed to provide at least 80% and up to 100% of the required damping force. Alternately, when the bobbin 74 provides all required damping, the relay switch 80 open circuits the multi-turn coil 76 during orbit.

FIG. 4 is an equivalent circuit diagram of the three state EM motor/damper 22 shown in FIGS. 2 and 3 in the launch and orbit damping modes. The equivalent base circuit 82 includes the induced emf force $K_{base}V$ where $K_{base}$ is the emf constant of the base and V is displacer/bobbin velocity, and the base's resistance $R_{base}$ and self inductance $L_{base}$. The equivalent multi-turn coil circuit 84 includes the induced emf force $K_{coil}V$ where $K_{coil}$ is the emf constant of the coil, and the coil's resistance $R_{coil}$ and self inductance $L_{coil}$. In addition, the N turn coil and 1 turn base form a transformer with mutual inductance M. The transformer coupling merely shifts a small amount of energy from one circuit to the other, and thus has an insignificant effect on the performance of the system.

The emf forces produce currents $I_{base}$ and $I_{coil}$ that are dissipated by the resistors $R_{base}$ and $R_{coil}$, respectively, to reject energy from the system as heat. This energy rejection process is the mechanism that gives rise to damping. The magnitudes of the intrinsic damping in the base and the variable damping of the coil are determined by their respective resistances, the lower the resistance the higher the damping force.

The base inherently produces the intrinsic damping force during all states of operation. Additional damping is obtained from the coil. During launch, the switch 80 short circuits the coil to maximize total damping. During orbit, the switch either adds series resistance $R_{ballast}$ to the coil so that the sum of the coil's and base's damping forces maintain the desired phase relation or open circuits the coil so that the base provides the entire damping force. In the latter case, the base must be designed to provide the required damping force.

The described invention provides a fail-safe characteristic that protects the displacer and maintains refrigeration. Operator errors cannot cause overdrive during refrigeration because the base always supplies near optimal damping. An accidentally opened coil circuit reduces damping only slightly so that refrigeration efficiency is only marginally effected. Furthermore, because the system is passive, a system failure cannot cause a servo loop to go unstable.

As shown in FIG. 5, a spacecraft 90 includes an infrared focal plane array 92 that senses infrared radiation from the Earth and a computer 94 that processes the detected radiation pattern to generate IR images. A transponder 96 broadcasts the images via an antenna 98 to an earth station. To improve the signal-to-noise ratio of the IR images, a compressor 100 generates a pressure wave that is applied to a Stirling expander 102 of the type described above to produce refrigeration at the focal plane array.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

I claim:

1. A Stirling expander, comprising:

a pressure housing having a forward opening;

a sleeve having open hot and cold ends, said open hot end being connected to the pressure housing's forward opening to define a passageway that extends from the cold end into the pressure housing and which is filled with a gas;

a cold tip that is connected to and pressure seals the sleeve's open end;

a displacer having a drive shaft that is connected to a piston;

a flexure suspension system in said pressure housing that holds said displacer axially in said passageway with the piston towards the cold end and the drive shaft extending into the pressure housing, said system flexing axially with a known spring constant to exert a flexure force on the displacer so that it reciprocates axially in said passageway;

a seal around said drive shaft that pressure seals the end of the passageway inside the pressure housing;

an inlet in said pressure housing that directs an externally applied pressure wave to said passageway to force the gas through the piston and exert a pneumatic force on the displacer;

a three state electromagnetic motor/damper in said pressure housing that controls the motion of said displacer in assembly, launch and orbit states, said motor/damper comprising:

a magnetic circuit that establishes a magnetic field;

a bobbin that is connected to the displacer's drive shaft in said magnetic field;

a multi-turn coil that is wound around said bobbin so that said bobbin and said coil interact with the magnetic field to produce a damping force that opposes the motion of the displacer, said multi-turn coil having a pair of lead wires that are capable of receiving a signal to position the displacer in the assembly state; and a control circuit that controls the resistance between the pair of lead wires so that during the launch state the damping force attains a high value and during the orbit state the damping force maintains a phase relation between the flexure force and pneumatic force such that a temperature gradient is established between the hot and cold ends of the sleeve to provide refrigeration at the cold tip.

2. The Stirling expander of claim 1, wherein said control circuit comprises:
   a ballast resistor; and
   a relay switch that connects the ballast resistor between the pair of leads during the orbit state, said ballast resistor having a resistance that is calculated to set the damping force to maintain the phase relation between the flexure force and pressure force.

3. The Stirling expander of claim 2, wherein said bobbin comprises:
   a conductive base around which said coil is wound, said conductive base forming a single turn coil that is shorted to itself, and which interacts with the magnetic field to produce an intrinsic damping force as a constant component of said damping force; and
   a support that mechanically connects the conductive base to the drive shaft.

4. The Stirling expander of claim 3, wherein the intrinsic damping force produced by the conductive base is at least 80% of the damping force applied to maintained the phase relation.

5. The Stirling expander of claim 3, wherein said support is non-conductive.

6. The Stirling expander of claim 1, wherein said bobbin comprises:
   a conductive base around which said coil is wound, said conductive base forming a single turn coil that is shorted to itself, and which interacts with the magnetic field to produce an intrinsic damping force as a constant component of said damping force; and
   a support that mechanically connects the conductive base to the drive shaft.

7. The Stirling expander of claim 6, wherein said control circuit comprises:
   a relay switch that short circuits the pair of leads during the launch state to provide a maximum damping force and open circuits the pair of leads during the orbit state such that the entire damping force is provided by the intrinsic damping force, said conductive base being designed such that the intrinsic damping force maintains the phase relation between the flexure force and pneumatic force.

8. A Stirling expander, comprising:
   a pressure housing having a forward opening;
   a sleeve having open hot and cold ends, said open hot end being connected to the pressure housing's forward opening to define a passageway that extends from the cold end into the pressure housing and which is filled with a gas;
   a cold tip that is connected to and pressure seals the sleeve's open end;
   a displacer having a drive shaft that is connected to a piston;
   a flexure suspension system in said pressure housing that holds said displacer axially in said passageway with the piston towards the cold end and the drive shaft extending into the pressure housing, said system flexing axially with a known spring constant to exert a flexure force on the displacer so that it reciprocates axially in said passageway;
   a seal around said drive shaft that pressure seals the end of the passageway inside the pressure housing;
   an inlet in said pressure housing that directs an externally applied pressure wave to said passageway to force the gas through the piston and exert a pneumatic force on the displacer;
   a three state electromagnetic motor/damper in said pressure housing that controls the motion of said displacer in assembly, launch and operation states, said motor/damper comprising:
      a magnetic circuit that establishes a magnetic field;
      a conductive bobbin that is connected to the displacer's drive shaft, and which forms a single turn coil that is shorted to itself;
      a multi-turn coil that is wound around said bobbin so that said bobbin and said multi-turn coil interact with the magnetic field to produce a total damping force that opposes the motion of the displacer, said multi-turn coil providing an extrinsic damping force and said bobbin providing an inherent damping force component that is present during all three states and provides at least 80% of the total damping force during operation, said multi-turn coil having a pair of lead wires that are capable of receiving a signal to position the displacer in the assembly state; and
      a relay switch that controls the resistance between the pair of lead wires so that during the launch state the total damping force attains a high value and during the operation state the total damping force maintains a phase relation between the flexure force and pneumatic force such that a temperature gradient is established between the hot and cold ends of the sleeve to provide refrigeration at the cold tip.

9. The Stirling expander of claim 8, wherein said relay switch connects a ballast resistor between the pair of leads during the operation state to reduce the extrinsic damping force component, said ballast resistor having a resistance that is calculated to set the extrinsic damping force component so that when combined with the inherent damping force the total damping force maintains the phase relation between the flexure force and pneumatic force.

10. The Stirling expander of claim 8, wherein said relay switch short circuits the pair of leads during the launch state to provide a maximum extrinsic damping force and open circuits the pair of leads during the orbit state such that the total damping force is provided entirely by the intrinsic damping force, said bobbin being designed such that the intrinsic damping force maintains the phase relation between the flexure force and pneumatic force.

11. An electromagnetic motor/damper for applying a damping force to an axially reciprocating displacer, comprising:
   a displacer that reciprocates along an axis;
   a magnetic circuit that establishes a magnetic field;
   a conductive bobbin that is connected to the displacer, said conductive bobbin forming a single turn coil that is shorted to itself;
   a multi-turn coil that is wound around said bobbin with a pair of lead wires extending from the coil, said bobbin and said multi-turn coil interacting with the magnetic field to produce intrinsic and extrinsic damping forces, respectively, that together oppose the motion of the displacer, said lead wires being capable of receiving a DC signal so that the multi-turn coil produces a motor force for positioning the displacer; and
   a relay switch that controls the resistance between the pair of lead wires to set the extrinsic damping force.

12. The motor/damper of claim 11, wherein said relay switch connects a ballast resistor between the pair of leads to set the damping force at a desired level.

13. The motor/damper of claim 11, wherein said relay switch short circuits the pair of leads to provide a maximum damping force and open circuits the pair of leads such that the entire damping force is provided by the intrinsic damping force.

14. A space-based sensor system, comprising:
   a spacecraft;
   an electrical device on said spacecraft; and
   a cryogenic refrigerator for refrigerating the electrical device, comprising:
      a compressor for generating a pressure wave; and
      a Stirling expander, comprising:
         a pressure housing that defines a passageway, said passageway being filled with a gas that responds to the pressure wave and exerts a pneumatic force;
         a cold tip that thermally couples the electrical device to the passageway;
         a displacer;
         a flexure suspension system that holds said displacer axially in said passageway and exerts a flexure force on the displacer to that it reciprocates axially; and
      a three state electromagnetic motor/damper in said pressure housing that controls the motion of said displacer in assembly, launch and orbit states, comprising:
         a magnetic circuit that establishes a magnetic field;
         a bobbin that is connected to the displacer in said magnetic field;
         a multi-turn coil that is wound around said bobbin so that said bobbin and said coil interact with the magnetic field to produce a damping force that opposes the motion of the displacer, said multi-turn coil having a pair of lead wires that are capable of receiving a signal to position the displacer in the assembly state; and
      a control circuit that controls the resistance between the pair of lead wires so that during the launch state the damping force attains a high value and during the orbit state the damping force maintains a phase relation between the flexure force and pneumatic force such that a temperature gradient is established to provide refrigeration at the cold tip to absorb heat from the electrical device via the cold tip.

15. The space-based sensor system of claim 14, wherein said control circuit comprises:
   a ballast resistor; and
   a relay switch that connects the ballast resistor between the pair of leads during the orbit state, said ballast resistor having a resistance that is calculated to set the coil's damping force to maintain the phase relation between the flexure force and pressure force.

16. The space-based sensor system of claim 15, wherein said bobbin comprises:
   a conductive base around which said coil is wound, said conductive base forming a single turn coil that is shorted to itself, and which interacts with the magnetic field to produce an intrinsic damping force as a constant component of said damping force; and
   a support that mechanically connects the conductive base to the drive shaft.

17. The space-based sensor system of claim 16, wherein the intrinsic damping force produced by the conductive base is at least 80% of the damping force applied to maintain the phase relation.

18. The space-based sensor system of claim 16, wherein said support is non-conductive.

19. The space-based sensor system of claim 14, wherein said bobbin comprises:
   a conductive base around which said coil is wound, said conductive base forming a single turn coil that is shorted to itself, and which interacts with the magnetic field to produce an intrinsic damping force as a constant component of said damping force; and
   a support that mechanically connects the conductive base to the drive shaft.

20. The Stirling expander of claim 19, wherein said control circuit comprises:
   a relay switch that short circuits the pair of leads during the launch state to provide a maximum damping force and open circuits the pair of leads during the orbit state such that the entire damping force is provided by the intrinsic damping force, said conductive base being designed such that the intrinsic damping force maintains the phase relation between the flexure force and pneumatic force.

* * * * *